United States Patent
Hughes et al.

(10) Patent No.: US 9,626,224 B2
(45) Date of Patent: Apr. 18, 2017

(54) OPTIMIZING AVAILABLE COMPUTING RESOURCES WITHIN A VIRTUAL ENVIRONMENT

(75) Inventors: David Anthony Hughes, Los Altos Hills, CA (US); John Burns, Los Altos, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 0 days.

(21) Appl. No.: 13/288,691

(22) Filed: Nov. 3, 2011

(65) Prior Publication Data

US 2013/0117494 A1 May 9, 2013

(51) Int. Cl.
| | |
|---|---|
| *G06F 12/08* | (2016.01) |
| *G06F 9/50* | (2006.01) |
| *G06F 9/52* | (2006.01) |
| *G06F 17/30* | (2006.01) |

(52) U.S. Cl.
CPC .......... *G06F 9/5077* (2013.01); *G06F 12/08* (2013.01)

(58) Field of Classification Search
CPC ...................................................... G06F 12/08
USPC .......................................................... 711/165
See application file for complete search history.

(56) References Cited

U.S. PATENT DOCUMENTS

| | | |
|---|---|---|
| 4,494,108 A | 1/1985 | Langdon, Jr. et al. |
| 4,558,302 A | 12/1985 | Welch |
| 4,612,532 A | 9/1986 | Bacon et al. |
| 5,023,611 A | 6/1991 | Chamzas et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |

(Continued)

FOREIGN PATENT DOCUMENTS

| | | |
|---|---|---|
| EP | 1507353 A2 | 2/2005 |
| JP | H05-061964 | 3/1993 |
| WO | WO0135226 A1 | 5/2001 |

OTHER PUBLICATIONS

"IPsec Anti-Replay Window: Expanding and Disabling," Cisco IOS Security Configuration Guide. 2005-2006 Cisco Systems, Inc. Last updated: Sep. 12, 2006, 14pages (Previously cited as: Zhao et al., "Analysis and Improvement on IPSEC Anti-Replay Window Protocol"; 2003; IEEE pp. 553-558).

(Continued)

*Primary Examiner* — Yong Choe
*Assistant Examiner* — Gautam Sain
(74) *Attorney, Agent, or Firm* — Carr & Ferrell LLP

(57) ABSTRACT

Methods and systems for the optimization of available computing resources within a virtual environment are disclosed. An exemplary method comprises determining the sizes of the computing resources available to the virtual machine and determining optimal data structures for the virtual machine based on the sizes of the computing resources. The optimal data structures may include an indexing data structure and a historic data. The method may further comprise allocating a Random Access Memory (RAM) and disk storage to the optimal data structures and configuring the optimal data structures within the RAM and the disk storage. The optimization of data structures involves balancing requirements of the indexing data structure and the historic data.

20 Claims, 9 Drawing Sheets

(56) References Cited

U.S. PATENT DOCUMENTS

| | | | |
|---|---|---|---|
| 5,483,556 | A | 1/1996 | Pillan et al. |
| 5,532,693 | A | 7/1996 | Winters et al. |
| 5,592,613 | A | 1/1997 | Miyazawa et al. |
| 5,611,049 | A | 3/1997 | Pitts |
| 5,627,533 | A | 5/1997 | Clark |
| 5,635,932 | A | 6/1997 | Shinagawa et al. |
| 5,652,581 | A | 7/1997 | Furlan et al. |
| 5,659,737 | A | 8/1997 | Matsuda |
| 5,675,587 | A | 10/1997 | Okuyama et al. |
| 5,710,562 | A | 1/1998 | Gormish et al. |
| 5,748,122 | A | 5/1998 | Shinagawa et al. |
| 5,754,774 | A | 5/1998 | Bittinger et al. |
| 5,802,106 | A | 9/1998 | Packer |
| 5,805,822 | A | 9/1998 | Long et al. |
| 5,883,891 | A | 3/1999 | Williams et al. |
| 5,903,230 | A | 5/1999 | Masenas |
| 5,955,976 | A | 9/1999 | Heath |
| 6,000,053 | A | 12/1999 | Levine et al. |
| 6,003,087 | A | 12/1999 | Housel, III et al. |
| 6,054,943 | A | 4/2000 | Lawrence |
| 6,081,883 | A | 6/2000 | Popelka et al. |
| 6,084,855 | A | 7/2000 | Soirinsuo et al. |
| 6,175,944 | B1 | 1/2001 | Urbanke et al. |
| 6,191,710 | B1 | 2/2001 | Waletzki |
| 6,295,541 | B1 | 9/2001 | Bodnar et al. |
| 6,308,148 | B1 | 10/2001 | Bruins et al. |
| 6,311,260 | B1 | 10/2001 | Stone et al. |
| 6,339,616 | B1 | 1/2002 | Kovalev |
| 6,374,266 | B1 | 4/2002 | Shnelvar |
| 6,434,641 | B1 | 8/2002 | Haupt et al. |
| 6,434,662 | B1 | 8/2002 | Greene et al. |
| 6,438,664 | B1 | 8/2002 | McGrath et al. |
| 6,452,915 | B1 | 9/2002 | Jorgensen |
| 6,489,902 | B2 | 12/2002 | Heath |
| 6,493,698 | B1 | 12/2002 | Beylin |
| 6,570,511 | B1 | 5/2003 | Cooper |
| 6,587,985 | B1 | 7/2003 | Fukushima et al. |
| 6,614,368 | B1 | 9/2003 | Cooper |
| 6,618,397 | B1 | 9/2003 | Huang |
| 6,633,953 | B2 | 10/2003 | Stark |
| 6,643,259 | B1 | 11/2003 | Borella et al. |
| 6,650,644 | B1 | 11/2003 | Colley et al. |
| 6,653,954 | B2 | 11/2003 | Rijavec |
| 6,667,700 | B1 | 12/2003 | McCanne et al. |
| 6,674,769 | B1 | 1/2004 | Viswanath |
| 6,718,361 | B1 | 4/2004 | Basani et al. |
| 6,728,840 | B1 | 4/2004 | Shatil et al. |
| 6,738,379 | B1 | 5/2004 | Balazinski et al. |
| 6,769,048 | B2 | 7/2004 | Goldberg et al. |
| 6,791,945 | B1 | 9/2004 | Levenson et al. |
| 6,856,651 | B2 | 2/2005 | Singh |
| 6,859,842 | B1 | 2/2005 | Nakamichi et al. |
| 6,862,602 | B2 | 3/2005 | Guha |
| 6,910,106 | B2 | 6/2005 | Sechrest et al. |
| 6,963,980 | B1 | 11/2005 | Mattsson |
| 6,968,374 | B2 | 11/2005 | Lemieux et al. |
| 6,978,384 | B1 | 12/2005 | Milliken |
| 7,007,044 | B1 | 2/2006 | Rafert et al. |
| 7,020,750 | B2 | 3/2006 | Thiyagaranjan et al. |
| 7,035,214 | B1 | 4/2006 | Seddigh et al. |
| 7,047,281 | B1 | 5/2006 | Kausik |
| 7,069,268 | B1 | 6/2006 | Burns et al. |
| 7,069,342 | B1 | 6/2006 | Biederman |
| 7,110,407 | B1 | 9/2006 | Khanna |
| 7,111,005 | B1 | 9/2006 | Wessman |
| 7,113,962 | B1 | 9/2006 | Kee et al. |
| 7,120,666 | B2 | 10/2006 | McCanne et al. |
| 7,145,889 | B1 | 12/2006 | Zhang et al. |
| 7,197,597 | B1 | 3/2007 | Scheid et al. |
| 7,200,847 | B2 | 4/2007 | Straube et al. |
| 7,215,667 | B1 | 5/2007 | Davis |
| 7,242,681 | B1 | 7/2007 | Van Bokkelen et al. |
| 7,243,094 | B2 | 7/2007 | Tabellion et al. |
| 7,266,645 | B2 | 9/2007 | Garg et al. |
| 7,278,016 | B1 | 10/2007 | Detrick et al. |
| 7,318,100 | B2 | 1/2008 | Demmer et al. |
| 7,366,829 | B1 | 4/2008 | Luttrell et al. |
| 7,380,006 | B2 | 5/2008 | Srinivas et al. |
| 7,383,329 | B2 | 6/2008 | Erickson |
| 7,383,348 | B2 | 6/2008 | Seki et al. |
| 7,388,844 | B1 | 6/2008 | Brown et al. |
| 7,389,357 | B2 | 6/2008 | Duffie, III et al. |
| 7,389,393 | B1 | 6/2008 | Karr et al. |
| 7,417,570 | B2 | 8/2008 | Srinivasan et al. |
| 7,417,991 | B1 | 8/2008 | Crawford et al. |
| 7,420,992 | B1 | 9/2008 | Fang et al. |
| 7,428,573 | B2 | 9/2008 | McCanne et al. |
| 7,451,237 | B2 | 11/2008 | Takekawa et al. |
| 7,453,379 | B2 | 11/2008 | Plamondon |
| 7,454,443 | B2 | 11/2008 | Ram et al. |
| 7,457,315 | B1 | 11/2008 | Smith |
| 7,460,473 | B1 | 12/2008 | Kodama et al. |
| 7,471,629 | B2 | 12/2008 | Melpignano |
| 7,532,134 | B2 | 5/2009 | Samuels et al. |
| 7,555,484 | B2 | 6/2009 | Kulkarni et al. |
| 7,571,343 | B1 | 8/2009 | Xiang et al. |
| 7,571,344 | B2 | 8/2009 | Hughes et al. |
| 7,587,401 | B2 | 9/2009 | Yeo et al. |
| 7,596,802 | B2 | 9/2009 | Border et al. |
| 7,619,545 | B2 | 11/2009 | Samuels et al. |
| 7,620,870 | B2 | 11/2009 | Srinivasan et al. |
| 7,624,446 | B1 * | 11/2009 | Wilhelm ............... 726/23 |
| 7,630,295 | B2 | 12/2009 | Hughes et al. |
| 7,639,700 | B1 | 12/2009 | Nabhan et al. |
| 7,643,426 | B1 | 1/2010 | Lee et al. |
| 7,644,230 | B1 | 1/2010 | Hughes et al. |
| 7,676,554 | B1 | 3/2010 | Malmskog et al. |
| 7,698,431 | B1 | 4/2010 | Hughes |
| 7,702,843 | B1 * | 4/2010 | Chen et al. ............ 711/6 |
| 7,714,747 | B2 | 5/2010 | Fallon |
| 7,746,781 | B1 | 6/2010 | Xiang |
| 7,764,606 | B1 | 7/2010 | Ferguson et al. |
| 7,810,155 | B1 | 10/2010 | Ravi |
| 7,827,237 | B2 | 11/2010 | Plamondon |
| 7,849,134 | B2 | 12/2010 | McCanne et al. |
| 7,853,699 | B2 | 12/2010 | Wu et al. |
| 7,873,786 | B1 | 1/2011 | Singh et al. |
| 7,941,606 | B1 | 5/2011 | Pullela et al. |
| 7,945,736 | B2 | 5/2011 | Hughes et al. |
| 7,948,921 | B1 | 5/2011 | Hughes et al. |
| 7,953,869 | B2 | 5/2011 | Demmer et al. |
| 7,970,898 | B2 | 6/2011 | Clubb et al. |
| 8,069,225 | B2 | 11/2011 | McCanne et al. |
| 8,072,985 | B2 | 12/2011 | Golan et al. |
| 8,090,027 | B2 | 1/2012 | Schneider |
| 8,095,774 | B1 | 1/2012 | Hughes et al. |
| 8,140,757 | B1 | 3/2012 | Singh et al. |
| 8,171,238 | B1 | 5/2012 | Hughes et al. |
| 8,209,334 | B1 | 6/2012 | Doerner |
| 8,225,072 | B2 | 7/2012 | Hughes et al. |
| 8,271,325 | B2 | 9/2012 | Silverman et al. |
| 8,307,115 | B1 | 11/2012 | Hughes |
| 8,312,226 | B2 | 11/2012 | Hughes |
| 8,352,608 | B1 | 1/2013 | Keagy et al. |
| 8,370,583 | B2 | 2/2013 | Hughes |
| 8,386,797 | B1 | 2/2013 | Danilak |
| 8,392,684 | B2 | 3/2013 | Hughes |
| 8,442,052 | B1 | 5/2013 | Hughes |
| 8,447,740 | B1 | 5/2013 | Huang et al. |
| 8,473,714 | B2 | 6/2013 | Hughes et al. |
| 8,489,562 | B1 | 7/2013 | Hughes et al. |
| 8,516,158 | B1 | 8/2013 | Wu et al. |
| 8,565,118 | B2 | 10/2013 | Shukla et al. |
| 8,595,314 | B1 | 11/2013 | Hughes |
| 8,613,071 | B2 | 12/2013 | Day et al. |
| 8,681,614 | B1 | 3/2014 | McCanne et al. |
| 8,700,771 | B1 | 4/2014 | Ramankutty et al. |
| 8,706,947 | B1 * | 4/2014 | Vincent ............... 711/6 |
| 8,725,988 | B2 | 5/2014 | Hughes et al. |
| 8,732,423 | B1 | 5/2014 | Hughes |
| 8,738,865 | B1 | 5/2014 | Hughes et al. |
| 8,743,683 | B1 | 6/2014 | Hughes |
| 8,755,381 | B2 | 6/2014 | Hughes et al. |
| 8,811,431 | B2 | 8/2014 | Hughes |

(56) References Cited

U.S. PATENT DOCUMENTS

| | | |
|---|---|---|
| 8,885,632 B2 | 11/2014 | Hughes et al. |
| 8,929,380 B1 | 1/2015 | Hughes et al. |
| 8,929,402 B1 | 1/2015 | Hughes |
| 8,930,650 B1 | 1/2015 | Hughes et al. |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,130,991 B2 | 9/2015 | Hughes |
| 9,143,455 B1 | 9/2015 | Hughes |
| 9,152,574 B2 | 10/2015 | Hughes et al. |
| 9,191,342 B2 | 11/2015 | Hughes et al. |
| 9,253,277 B2 | 2/2016 | Hughes et al. |
| 9,306,818 B2 | 4/2016 | Aumann et al. |
| 9,363,309 B2 | 6/2016 | Hughes |
| 9,397,951 B1 | 7/2016 | Hughes |
| 9,438,538 B2 | 9/2016 | Hughes et al. |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0010702 A1 | 1/2002 | Ajtai et al. |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1 | 9/2002 | Zhang et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0046572 A1 | 3/2003 | Newman et al. |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer, Jr. et al. |
| 2005/0055399 A1 | 3/2005 | Savchuk |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0235119 A1 | 10/2005 | Sechrest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0136913 A1* | 6/2006 | Sameske ............... G06F 9/5044 718/1 |
| 2006/0143497 A1 | 6/2006 | Zohar et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1* | 3/2007 | Hughes ......................... 709/218 |
| 2007/0076693 A1 | 4/2007 | Krishnaswamy |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De La Cruz et al. |
| 2007/0174428 A1 | 7/2007 | Lev Ran et al. |
| 2007/0179900 A1 | 8/2007 | Daase et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1* | 2/2008 | Hughes ................. H04L 45/745 370/389 |
| 2008/0071818 A1 | 3/2008 | Apanowicz et al. |

(56) References Cited

U.S. PATENT DOCUMENTS

| | | |
|---|---|---|
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1* | 1/2009 | Shultz ............... G06F 9/5016 711/170 |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter, III et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0175172 A1 | 7/2009 | Prytz et al. |
| 2009/0204961 A1 | 8/2009 | DeHaan et al. |
| 2009/0234966 A1 | 9/2009 | Samuels et al. |
| 2009/0245114 A1 | 10/2009 | Vijayaraghavan |
| 2009/0265707 A1* | 10/2009 | Goodman et al. ............. 718/1 |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1* | 1/2010 | Brant et al. ................. 711/6 |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1* | 5/2010 | Kami ...................... 718/104 |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0246584 A1 | 9/2010 | Ferguson et al. |
| 2010/0290364 A1 | 11/2010 | Black |
| 2010/0318892 A1 | 12/2010 | Teevan et al. |
| 2011/0002346 A1 | 1/2011 | Wu |
| 2011/0022812 A1 | 1/2011 | van der Linden et al. |
| 2011/0113472 A1 | 5/2011 | Fung et al. |
| 2011/0154169 A1 | 6/2011 | Gopal et al. |
| 2011/0154329 A1* | 6/2011 | Arcese et al. ................. 718/1 |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0258071 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0036325 A1* | 2/2012 | Mashtizadeh et al. ....... 711/118 |
| 2012/0069131 A1 | 3/2012 | Abelow |
| 2012/0173759 A1 | 7/2012 | Agarwal et al. |
| 2012/0218130 A1 | 8/2012 | Boettcher et al. |
| 2012/0221611 A1* | 8/2012 | Watanabe et al. ........... 707/827 |
| 2012/0230345 A1 | 9/2012 | Ovsiannikov |
| 2012/0239872 A1 | 9/2012 | Hughes et al. |
| 2013/0018722 A1 | 1/2013 | Libby |
| 2013/0018765 A1* | 1/2013 | Fork et al. ..................... 705/34 |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1* | 3/2013 | Assuncao et al. ........... 709/224 |
| 2013/0086236 A1* | 4/2013 | Baucke et al. ............... 709/223 |
| 2013/0094501 A1 | 4/2013 | Hughes |
| 2013/0103655 A1 | 4/2013 | Fanghaenel et al. |
| 2013/0121209 A1 | 5/2013 | Padmanabhan et al. |
| 2013/0141259 A1 | 6/2013 | Hazarika et al. |
| 2013/0163594 A1 | 6/2013 | Sharma et al. |
| 2013/0250951 A1 | 9/2013 | Koganti |
| 2013/0263125 A1 | 10/2013 | Shamsee et al. |
| 2013/0282970 A1 | 10/2013 | Hughes et al. |
| 2013/0343191 A1 | 12/2013 | Kim et al. |
| 2014/0052864 A1 | 2/2014 | Van Der Linden et al. |
| 2014/0075554 A1 | 3/2014 | Cooley |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0181381 A1 | 6/2014 | Hughes et al. |
| 2014/0269705 A1 | 9/2014 | DeCusatis et al. |
| 2014/0279078 A1 | 9/2014 | Nukala et al. |
| 2014/0379937 A1 | 12/2014 | Hughes et al. |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0120663 A1 | 4/2015 | Le Scouarnec et al. |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0334210 A1 | 11/2015 | Hughes |
| 2016/0014051 A1 | 1/2016 | Hughes et al. |
| 2016/0034305 A1 | 2/2016 | Shear et al. |
| 2016/0218947 A1 | 7/2016 | Hughes et al. |
| 2016/0255542 A1 | 9/2016 | Hughes et al. |

OTHER PUBLICATIONS

Singh et al.; "Future of Internet Security—IPSEC"; pp. 1-8.

Muthitacharoen, Athicha et al., "A Low-bandwidth Network File System," 2001, in Proc. of the 18th ACM Symposium on Operating Systems Principles, Banff, Canada, pp. 174-187.

"Shared LAN Cache Datasheet", 1996, http://www.lancache.com/slcdata.htm.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

Hong, B et al. "Duplicate data elimination in a SAN file system", In Proceedings of the 21st Symposium on Mass Storage Systems (MSS '04), Goddard, MD, Apr. 2004. IEEE.

You, L. L. and Karamanolis, C. 2004. "Evaluation of efficient archival storage techniques", In Proceedings of the 21st IEEE Symposium on Mass Storage Systems and Technologies (MSST).

Douglis, F. et al., "Application specific Delta-encoding via Resemblance Detection", Published in the 2003 USENIX Annual Technical Conference.

You, L. L. et al., "Deep Store an Archival Storage System Architecture" Data Engineering, 2005. ICDE 2005. Proceedings of the 21st. Intl. Conf. on Data Eng., Tokyo, Japan, Apr. 5-8, 2005. pp. 12.

Manber, Udi, "Finding Similar Files in a Large File System", TR 93-33 Oct. 1994, Department of Computer Science, University of Arizona. http://webglimpse.net/pubs/TR93-33.pdf. Also appears in the 1994 winter USENIX Technical Conference.

Knutsson, Bjorn et al., "Transparent Proxy Signalling", Journal of Communications and Networks, vol. 3, No. 2, Jun. 2001.

Definition memory (n), Webster's Third New International Dictionary, Unabridged (1993), available at <http://lionreference.chadwyck.com> (Dictionaries/Webster's Dictionary).

Definition appliance, 2c, Webster's Third New International Dictionary, Unabridged (1993), available at <http://lionreference.chadwyck.com> (Dictionaries/Webster's Dictionary).

Newton, "Newton's Telecom Dictionary", 17th Ed., 2001, pp. 38, 201, and 714.

Silver Peak Systems, "The Benefits of Byte-level WAN Deduplication" (2008).

Final Written Decision, Dec. 30, 2014, Inter Partes Review Case No. IPR2013-00403.

(56) References Cited

OTHER PUBLICATIONS

Final Written Decision, Dec. 30, 2014, Inter Partes Review Case No. IPR2013-00402.
"Business Wire, ""Silver Peak Systems Delivers Family of Appliances for Enterprise-Wide Centralization of Branch Office Infrastructure; Innovative Local Instance Networking Approach Overcomes Traditional Application Acceleration Pitfalls"" (available at http://www.businesswire.com/news/home/20050919005450/en/Silver-Peak-Systems-Delivers-Family-Appliances-Enterprise-Wide#. UVzkPk7u-1 (last visited Aug. 8, 2014))."
Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)).
Tseng, Josh, "When accelerating secure traffic is not secure" (available at http://www.riverbed.com/blogs/whenaccelerati.html?&isSearch=true&pageSize=3&page=2 (last visited Aug. 8, 2014)).
Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)).
Riverbed, "Riverbed Awarded Patent on Core WDS Technology" (available at: http://www.riverbed.com/about/news-articles/pressreleases/riverbed-awarded-patent-on-core-wds-technology.html (last visited Aug. 8, 2014)).
Final Written Decision, Jun. 9, 2015, Inter Partes Review Case No. IPR2014-00245.
Allowance, May 10, 2014, U.S. Appl. No. 11/498,491, filed Aug. 2, 2006.
Final, Mar. 25, 2014, U.S. Appl. No. 11/498,491, filed Aug. 2, 2006.
Request for Trial Granted, Jun. 11, 2014, U.S. Appl. No. 11/497,026, filed Jul. 31, 2006.
Allowance, Apr. 14, 2014, U.S. Appl. No. 12/313,618, filed Nov. 20, 2008.
Final, Apr. 1, 2014, U.S. Appl. No. 13/274,162, filed Oct. 14, 2011.
Advisory, Jun. 27, 2014, U.S. Appl. No. 13/274,162, filed Oct. 14, 2011.
Non-Final, Jul. 30, 2014, U.S. Appl. No. 13/274,162, filed Oct. 14, 2011.
Non-Final, Sep. 10, 2013, U.S. Appl. No. 13/757,548, filed Feb. 1, 2013.
Non-Final, Jun. 6, 2014 U.S. Appl. No. 14/190,940, filed Feb. 26, 2014.
Allowance, Sep. 5, 2014, U.S. Appl. No. 14/248,229, filed Apr. 8, 2014.
Non-Final, Jul. 11, 2014, U.S. Appl. No. 14/248,188, filed Apr. 8, 2014.
Advisory Action, Mar. 25, 2015, U.S. Appl. No. 13/274,162, filed Oct. 14, 2011.
Notice of Allowance, May 21, 2015, U.S. Appl. No. 13/274,162, filed Oct. 14, 2011.
Notice of Allowance, Sep. 12, 2014, U.S. Appl. No. 13/657,733, filed Oct. 22, 2012.
Supplemental Notice of Allowability, Oct. 9, 2014, U.S. Appl. No. 13/657,733, filed Oct. 22, 2012.
Non-Final Office Action, Oct. 1, 2014, U.S. Appl. No. 14/190,940, filed Feb. 26, 2014.
Notice of Allowance, Mar. 16, 2015, U.S. Appl. No. 14/190,940, filed Feb. 26, 2014.
Non-Final Office Action, Jun. 8, 2015, U.S. Appl. No. 14/248,167, filed Apr. 8, 2014.
Notice of Allowance, Oct. 6, 2014, U.S. Appl. No. 14/270,101, filed May 5, 2014.
Notice of Allowance, Jun. 3, 2015, U.S. Appl. No. 14/548,195, filed Nov. 19, 2014.
Non-Final Office Action, Mar. 11, 2015, U.S. Appl. No. 14/549,425, filed Nov. 20, 2014.
Notice of Allowance, Jul. 27, 2015, U.S. Appl. No. 14/549,425, filed Nov. 20, 2014.
Non-Final Office Action, May 6, 2015, U.S. Appl. No. 14/477,804, filed Sep. 4, 2014.
Non-Final Office Action, May 18, 2015, U.S. Appl. No. 14/679,965, filed Apr. 6, 2015.
Final Office Action, Jul. 14, 2015, U.S. Appl. No. 13/482,321, filed May 29, 2012.
Non-Final Office Action, Jul. 15, 2015, U.S. Appl. No. 14/734,949, filed Jun. 9, 2015.
Final Office Action, Dec. 21, 2015, U.S. Appl. No. 14/679,965, filed Apr. 6, 2015.
Advisory Action, Nov. 25, 2015, U.S. Appl. No. 13/482,321, filed May 29, 2012.
Non-Final Office Action, Dec. 15, 2015, U.S. Appl. No. 14/479,131, filed Sep. 5, 2014.
Non-Final Office Action, Dec. 16, 2015, U.S. Appl. No. 14/859,179, filed Sep. 18, 2015.
Non-Final Office Action, Jan. 12, 2016, U.S. Appl. No. 14/477,804, filed Sep. 4, 2014.
Notice of Allowance, Feb. 8, 2016, U.S. Appl. No. 14/543,781, filed Nov. 17, 2014.
Final Office Action, Sep. 18, 2015, U.S. Appl. No. 14/477,804, filed Sep. 4, 2014.
Non-Final Office Action, Aug. 11, 2015, U.S. Appl. No. 14/677,841, filed Apr. 2, 2015.
Non-Final Office Action, Aug. 18, 2015, U.S. Appl. No. 14/543,781, filed Nov. 17, 2014.
Notice of Allowance, Oct. 5, 2015, U.S. Appl. No. 14/734,949, filed Jun. 9, 2015.
Corrected Notice of Allowability, Mar. 7, 2016, U.S. Appl. No. 14/543,781, filed Nov. 17, 2014.
Notice of Allowance, Feb. 16, 2016, U.S. Appl. No. 14/248,167, filed Apr. 8, 2014.
Notice of Allowance, Mar. 2, 2016, U.S. Appl. No. 14/677,841, filed Apr. 2, 2015.
Corrected Notice of Allowability, Mar. 14, 2016, U.S. Appl. No. 14/677,841, filed Apr. 2, 2015.
Advisory Action, Mar. 21, 2016, U.S. Appl. No. 14/679,965, filed Apr. 6, 2015.
Non-Final Office Action, May 3, 2016, U.S. Appl. No. 14/679,965, filed Apr. 6, 2015.
Notice of Allowance, Jun. 3, 2016, U.S. Appl. No. 14/859,179, filed Sep. 18, 2015.
Non-Final Office Action, Jun. 15, 2016, U.S. Appl. No. 15/091,533, filed Apr. 5, 2016.
Non-Final Office Action, Jun. 22, 2016, U.S. Appl. No. 14/447,505, filed Jul. 30, 2014.
Final Office Action, Jul. 19, 2016, U.S. Appl. No. 14/479,131, filed Sep. 5, 2014.
Non-Final Office Action, Jul. 25, 2016, U.S. Appl. No. 14/067,619, filed Oct. 30, 2013.
Final Office Action, Jul. 26, 2016, U.S. Appl. No. 14/477,804, filed Sep. 4, 2014.
Non-Final Office Action, Aug. 10, 2016, U.S. Appl. No. 15/148,933, filed May 6, 2016.
Notice of Allowance, Aug. 24, 2016, U.S. Appl. No. 14/679,965, filed Apr. 6, 2015.
Non-Final Office Action, Aug. 26, 2016, U.S. Appl. No. 13/621,534, filed Sep. 17, 2012.
Final Office Action, Oct. 4, 2016, U.S. Appl. No. 15/091,533, filed Apr. 5, 2016.
Non-Final Office Action, Oct. 6, 2016, U.S. Appl. No. 14/479,131, filed Sep. 5, 2014.
Request for Trial Granted, Jan. 2, 2014, U.S. Appl. No. 11/202,697, filed Aug. 12, 2005.
Allowance, Oct. 23, 2012, U.S. Appl. No. 11/202,697, filed Aug. 12, 2005.
Decision on Appeal, Sep. 17, 2012, U.S. Appl. No. 11/202,697, filed Aug. 12, 2005.
Examiner's Answer to Appeal Brief, Oct. 27, 2009, U.S. Appl. No. 11/202,697, filed Aug. 12, 2005.

(56) References Cited

OTHER PUBLICATIONS

Request for Trial Granted, Jan. 2, 2014, U.S. Appl. No. 11/240,110, filed Sep. 29, 2005.
Allowance, Aug. 30, 2012, U.S. Appl. No. 11/240,110, filed Sep. 29, 2005.
Decision on Appeal, Jun. 28, 2012, U.S. Appl. No. 11/240,110, filed Sep. 29, 2005.
Examiner's Answer to Appeal Brief, Oct. 27, 2009, U.S. Appl. No. 11/240,110, filed Sep. 29, 2005.
Allowance, Apr. 28, 2009, U.S. Appl. No. 11/357,657, filed Feb. 16, 2006.
Allowance, Sep. 8, 2009, U.S. Appl. No. 11/263,755, filed Oct. 31, 2005.
Final, May 11, 2009, U.S. Appl. No. 11/263,755, filed Oct. 31, 2005.
Allowance, Feb. 14, 2014, U.S. Appl. No. 11/498,473, filed Aug. 2, 2006.
Non-Final, Jul. 10, 2013, U.S. Appl. No. 11/498,473, filed Aug. 2, 2006.
Final, Aug. 12, 2011, U.S. Appl. No. 11/498,473, filed Aug. 2, 2006.
Advisory, Oct. 2, 2009, U.S. Appl. No. 11/498,473, filed Aug. 2, 2006.
Non-Final, Oct. 9, 2013, U.S. Appl. No. 11/498,491, filed Aug. 2, 2006.
Advisory, Jul. 16, 2013, U.S. Appl. No. 11/498,491, filed Aug. 2, 2006.
Allowance, Dec. 26, 2012, U.S. Appl. No. 11/497,026, filed Jul. 31, 2006.
Decision on Appeal, Nov. 14, 2012, U.S. Appl. No. 11/497,026, filed Jul. 31, 2006.
Examiner's Answer to Appeal Brief, Oct. 14, 2009, U.S. Appl. No. 11/497,026, filed Jul. 31, 2006.
Allowance, Dec. 3, 2009, U.S. Appl. No. 11/796,239, filed Apr. 27, 2007.
Allowance, Jan. 16, 2014, U.S. Appl. No. 12/217,440, filed Jul. 3, 2008.
Non-Final, Aug. 14, 2013, U.S. Appl. No. 12/217,440, filed Jul. 3, 2008.
Advisory, Jan. 29, 2013, U.S. Appl. No. 12/217,440, filed Jul. 3, 2008.
Advisory, Jul. 2, 2012, U.S. Appl. No. 12/217,440, filed Jul. 3, 2008.
Allowance, Feb. 29, 2012, U.S. Appl. No. 11/825,440, filed Jul. 5, 2007.
Allowance, Nov. 12, 2011, U.S. Appl. No. 11/825,497, filed Jul. 5, 2007.
Allowance, Feb. 11, 2011, U.S. Appl. No. 11/903,416, filed Sep. 20, 2007.
Allowance, May 14, 2013, U.S. Appl. No. 11/998,726, filed Nov. 30, 2007.
Advisory, May 23, 2011, U.S. Appl. No. 11/998,726, filed Nov. 30, 2007.
Allowance, Mar. 21, 2013, U.S. Appl. No. 12/070,796, filed Feb. 20, 2008.
Allowance, Mar. 16, 2012, U.S. Appl. No. 12/151,839, filed May 8, 2008.
Final, Jan. 14, 2014, U.S. Appl. No. 12/313,618, filed Nov. 20, 2008.
Non-Final, Jul. 1, 2013, U.S. Appl. No. 12/313,618, filed Nov. 20, 2008.
Advisory, Aug. 20, 2012, U.S. Appl. No. 12/313,618, filed Nov. 20, 2008.
Allowance, Jan. 20, 2011, U.S. Appl. No. 12/622,324, filed Nov. 19, 2009.
Allowance, Dec. 9, 2010, U.S. Appl. No. 12/622,324, filed Nov. 19, 2009.
Allowance, Mar. 26, 2012, U.S. Appl. No. 13/112,936, filed May 20, 2011.
Non-Final, Oct. 22, 2013, U.S. Appl. No. 13/274,162, filed Oct. 14, 2011.
Allowance, Jan. 2, 2014, U.S. Appl. No. 13/427,422, filed Mar. 22, 2012.
Advisory, Sep. 27, 2013, U.S. Appl. No. 13/427,422, filed Mar. 22, 2012.
Final, Jul. 17, 2013, U.S. Appl. No. 13/427,422, filed Mar. 22, 2012.
Advisory, Jan. 24, 2013, U.S. Appl. No. 13/427,422, filed Mar. 22, 2012.
Allowance, Feb. 19, 2013, U.S. Appl. No. 13/482,321, filed May 29, 2012.
Allowance, Sep. 26, 2013, U.S. Appl. No. 13/517,575, filed Jun. 13, 2012.
Advisory, Apr. 4, 2013, U.S. Appl. No. 13/517,575, filed Jun. 13, 2012.
Allowance, Jan. 3, 2014, U.S. Appl. No. 13/757,548, filed Feb. 1, 2013.
Non-Final, Jan. 3, 2014, U.S. Appl. No. 13/757,548, filed Feb. 1, 2013.
Allowance, Nov. 25, 2013, U.S. Appl. No. 13/917,517, filed Jun. 13, 2013.
Non-Final, Aug. 14, 2013, U.S. Appl. No. 13/917,517, filed Jun. 13, 2013.
Office Action, Nov. 20, 2012, filed Jul. 3, 2008, U.S. Appl. No. 12/217,440.
Office Action, Jan. 3, 2013, filed May 29, 2012, U.S. Appl. No. 13/482,321.
Office Action, Jan. 11, 2013, filed Jun. 13, 2012, U.S. Appl. No. 13/517,575.
Office Action, Feb. 1, 2013, filed Feb. 20, 2008, U.S. Appl. No. 12/070,796.
Office Action, Apr. 2, 2013, filed Mar. 22, 2012, U.S. Appl. No. 13/427,422.
Office Action, Apr. 15, 2013, filed Aug. 2, 2006, U.S. Appl. No. 11/498,491.
Office Action, Feb. 4, 2013, filed Aug. 2, 2006, U.S. Appl. No. 11/498,473.
Final Office Action, Jan. 12, 2015, U.S. Appl. No. 13/274,162, filed Oct. 14, 2011.
Notice of Allowance, Jan. 23, 2015, U.S. Appl. No. 14/248,188, filed Apr. 8, 2014.
Non-Final Office Action, Nov. 26, 2014, U.S. Appl. No. 14/333,486, filed Jul. 16, 2014.
Notice of Allowance, Dec. 22, 2014, U.S. Appl. No. 14/333,486, filed Jul. 16, 2014.
Non-Final Office Action, Dec. 31, 2014, U.S. Appl. No. 13/621,534, filed Sep. 17, 2012.
Non-Final Office Action, Jan. 23, 2015, U.S. Appl. No. 14/548,195, filed Nov. 19, 2014.

\* cited by examiner

OPTIMIZING AVAILABLE COMPUTING RESOURCES WITHIN A VIRTUAL ENVIRONMENT

TECHNICAL FIELD

This disclosure relates generally to the allocation of computing resources and, more particularly, to methods and systems for the optimization of available and allocated computing resources for a virtual machine.

DESCRIPTION OF RELATED ART

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

In current computing network environments, the utilization of virtual machines is widely deployed. A virtual machine (VM) is a software implementation of a machine (e.g. a computer) that executes computer programs similarly to a physical computer. Multiple virtual machines can be created within a single physical computer. Each virtual machine may run its own operating system and other software so that a single physical computer may include a plurality of virtual machines running independently of each other. Such a physical computer can be used as a host computer within a computer network and allow users to access its resident virtual machines from remote locations. A virtual machine environment can be used to isolate a certain computer program so it is executed within a secure manner through the usage of the virtual environment.

Virtual machines embedded within the host computer can logically share its computing resources, such as processors, storage, auxiliary memory, Random Access Memory (RAM), and other physical appliances that are included in the physical computer, to create their own virtual computing resources. In other words, each virtual machine may use a part of the shared computing resources to execute its own specific tasks such as running the operating system and other applications.

Thus, a virtual environment requires resource allocation before the users may utilize the virtual machines. The resources can be allocated evenly or depending on the typical tasks performed by a specific virtual machine. Users can adjust the allocation of resources to increase or decrease resources for each virtual machine.

Accordingly, each time a virtual machine is booted, it can be provided with new amounts of computing resources. In such a changing environment, the allocated computing resources are not optimized and the overall virtual machine performance deteriorates. Hence, the virtual machines may require optimization of the allocated computing resources each time they are changed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with various embodiments and the corresponding disclosure thereof, a method for the optimization of resources within a virtual machine is disclosed. The method may comprise determining the sizes of computing resources available to the virtual machine and determining optimal data structures for the virtual machine based on the determination. The optimal data structures may include an indexing data, historic data, and other data structures. The method may further comprise allocating a RAM and disk storage to the optimal data structures and configuring the optimal data structures within the RAM and the disk storage.

According to various exemplary embodiments, the computing resources may include the RAM, a Central Processing Unit (CPU), the disk storage, and a VM container. The optimal data structure sizes can be based on specific historical data. The optimal data structures can be based on the relative sizes of the indexing data structure and the historic data. The indexing data structures may include at least one hash table, while the historic data may comprise a flow history pages table. The determining of optimal data structures may comprise determining optimal sizes of the one or more signature array hash tables and the flow history pages table. The optimal sizes of the one or more signature array hash tables can be determined through an iterative process. Determining the sizes of the computing resources may comprise requesting a virtual machine manager to provide information related to allocated resources and/or acquiring usage metrics for computing resources.

Also disclosed is a system for the optimization of resources within a virtual machine. The system may comprise: a size determination module configured to determine the sizes of computing resources available to the virtual machine, an optimal data structure determination module configured to determine optimal data structures for the virtual machine, an allocation module configured to allocate RAM and a disk storage to the optimal data structures, and a configuration module to configure the optimal data structures within the RAM and the disk storage. The system may further and optionally comprise a communication module configured to communicate, to a further virtual machine, information related to the optimal data structures for the virtual machine.

Also disclosed is a computer-readable medium having instructions stored thereon, which when executed by one or more computers, cause the one or more computers to implement the method for optimization of resources within a virtual machine.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
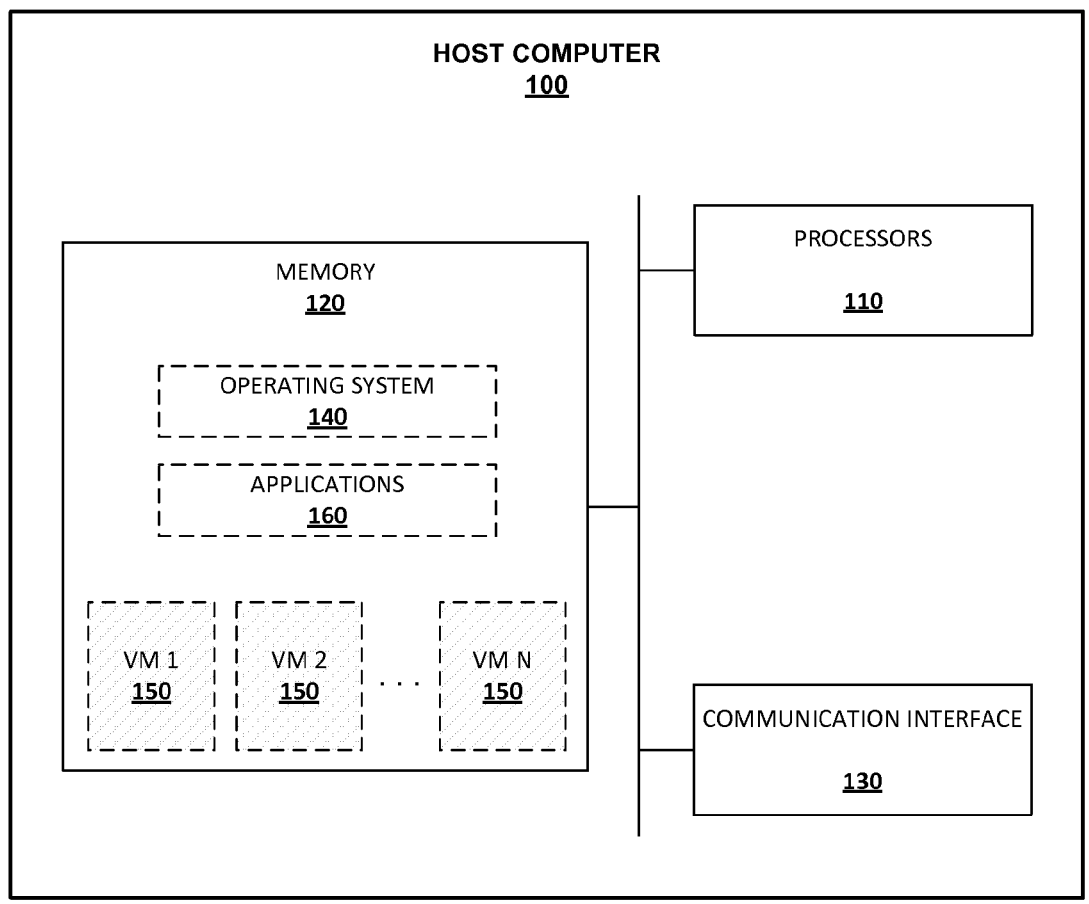
FIG. 1 shows a block diagram of a host computer suitable for embedding virtual machines.

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

According to various embodiments disclosed herein, methods for the optimization of resources within a virtual machine are disclosed. The methods may provide an intelligent and effective way of optimizing available and previously allocated computing resources for each virtual machine within a virtual machine container. The computing resources can be optimized so that the size of the data structures associated with a RAM and disk storage can provide effective usage of these resources and increase overall performance.

A virtual machine is a software implementation of a machine that may execute software programs like a physical machine. An important characteristic of a virtual machine is that the software running inside is limited to the resources and abstractions allocated to the virtual machine by its host computer.

A hypervisor may refer to a hardware virtualization technique that runs inside the host computer and manages the execution of virtual machine within the host computer. A virtual machine manager is a virtual-machine manager application which may be utilized to configure the virtual machine. In contrast to the hypervisor which runs inside the host computer, the virtual machine manager may run inside or outside the host computer.

When a virtual machine is booted, the sizes of the computing resources available to the virtual machine may be determined through a request to the virtual machine manager or to the hypervisor to provide information related to the allocated resources.

In some examples, the sizes of computing resources can be determined by analyzing metrics data obtained from the virtual machine manager or by request to the operating system of the host computer.

The term "computing resources," as used herein, may refer to one or more of the following: a RAM, a CPU, disk storage, and a Virtual Machine container. The virtual machine container may be associated with the physical resources of a host computer. Accordingly, the size of the virtual machine container may be determined by the amount of physical resources, such as a CPU, a memory, storage, a network bandwidth, and/or an input/output (I/O) bandwidth available to the virtual machine container.

Once the sizes of the allocated computing resources are determined, the optimal data structures for the virtual machine are determined based on the sizes of the allocated computing resources. Generally, the data structures may include an indexing data structure and historic data, which are correlated. In one example, the indexing data structure includes at least one hash table that maps calculated hash functions related to various data fragments to their indexes (e.g., memory addresses where such data is stored). As is described below in more detail, several hash tables may be provided, such as a coarse hash table and a fine hash table. The historic data is a typical data structure that maps the data fragments to their identifying keys (e.g., addresses).

One particular example of the historic data is a flow history pages table. Accordingly, the determination of optimal data structures for the virtual machine may include defining optimal sizes of the indexing data structure and the historic data. Such sizes can be calculated in many ways, and may generally be iterative and statistical. In some examples, the optimal sizes of these data structures (e.g., tables) may be based on an analysis of certain historical data including, for example, previously calculated sizes of these data structures related to certain sizes of allocated resources of the same or a different virtual machine. The optimization of data structure table sizes may include finding a balance between the requirements of the indexing data structure and the historic data.

Once the optimal data structures are determined for the virtual machine, the RAM and/or the disk storage can be allocated to the optimal data structures. Thus, given certain sizes of the available resources, data structures are allocated resources to provide efficient and fast data retrieval, transfer, and storage. As a result, the overall operation efficiency of the virtual machine may be increased. In addition, the optimal data structures within the RAM and the disk storage may be periodically reconfigured to meet the changing conditions of the available computing resources.

The following provides a detailed description of various exemplary embodiments related to methods and systems for the optimization of resources within a virtual machine.

Referring now to the drawings, FIG. 1 shows a block diagram illustrating a host computer 100 suitable for embedding virtual machines. The host computer 100 may comprise one or more processors 110, a memory 120, and a communication interface 130.

The processor 110 may refer to a computer appliance that carries out computer program instructions to perform basic arithmetical, logical, and I/O operations. The processor 110 may be implemented as a CPU, a controller, a microcontroller, and so forth.

The memory 120 may refer to disk storage (e.g., a hard disk drive), a RAM, a Read Only Memory (ROM), and other types of volatile or nonvolatile data storages.

A communication interface 130 can be used to connect the host computer 100 to various I/O peripheral devices that may be provided, including a keyboard, a mouse, a display, a communication port, a modem, and so forth.

In the example shown, the memory 120 may store, among other things, software operating system 140, software implementing virtual machines 150, and software applications 160. The operating system 140 may be configured to execute a number of software modules and applications and generate one or more virtual machines (e.g., Virtual Machine 1, Virtual Machine 2, . . . Virtual Machine N). Generally, the virtual machines 150 can be generated using any of the technologies presently known to those skilled in the art. At each time instance, one or more virtual machines 150 can be executed by the host computer 100.

Figure 2:
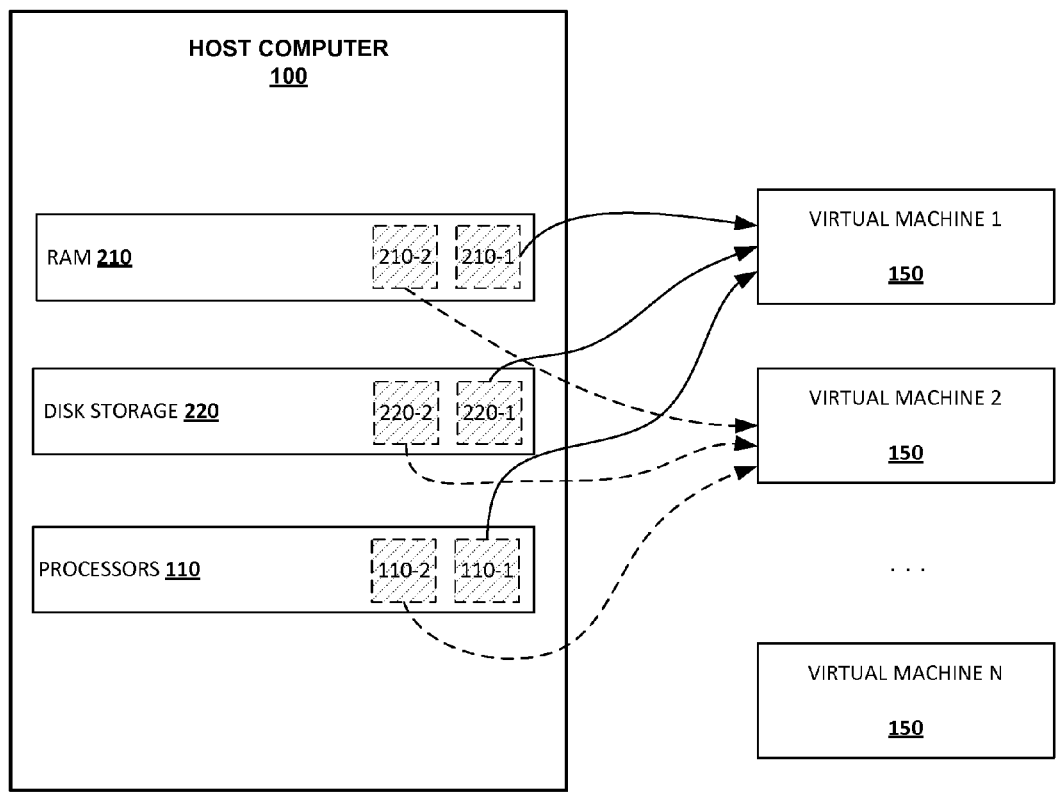
FIG. 2 shows a block diagram of the host computers and allocation of computing resources to virtual machines.

FIG. 2 is a block diagram illustrating the host computer 100 and a way of allocating computing resources to different virtual machines. As shown, the host computer 100 may comprise physical computing resources, namely a CPU 110, a RAM 210, and disk storage 220. These computing resources may be virtually partitioned in such a way that some parts of CPU processing power 110-1, some parts of the RAM 210-1, and some parts of the disk storage 220-1 are allocated to the Virtual Machine 1 150. Similarly, a part of CPU processing power 110-2, a part of the RAM 210-2, and a part of the disk storage 220-2 are allocated to the Virtual Machine 2 150. Each allocated part can be of any size. For instance, the computing resources can be uniformly partitioned or some parts can be bigger or smaller than others. In some exemplary embodiments, a minimum size for each part of the computing resources can be defined such that it would be impossible to allocate a smaller part of resources than specified by the minimum size. Similarly, a maximum size for each part of computing resources can be predefined.

Figure 3:
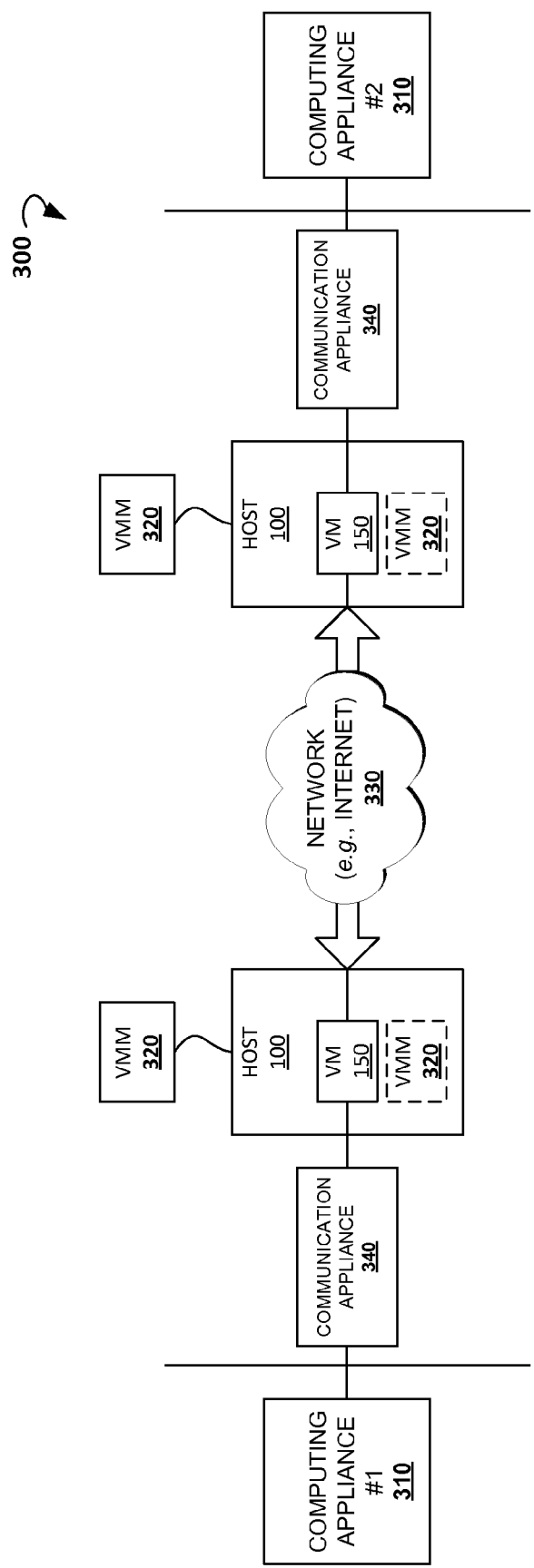
FIG. 3 shows a block diagram of a computer network environment suitable for implementing virtual machines.

FIG. 3 is a simplified block diagram showing a computer network environment 300 suitable for implementing virtual machines. The computer network environment 300 may comprise one or more computing appliances 310, communication appliances 340, host computers 100, virtual machine managers (VMM) 320, and a network 330. The network 330 may couple one or more of the aforementioned modules. Such a computer network environment 300 can also be known as a network memory system. It will be understood that the host 100 can be either physical or virtual. Additionally, even though FIG. 3 illustrates two VMMs 320 managing respective VMs 150, in some embodiments, a single VMM 320 may manage both VMs 150. Furthermore, VMMs 320 may be internal or external with respect to their respective hosts 100. By optimally allocating resources between various data structures within the virtual machines 150, data packets are optimized as they travel between computing appliances 310.

Even though the host computers 100 and the VMs 150 are shown as being in line with the computing appliances 310, this may not necessarily be the fact. For example, the data packets can be redirected to the host computers 100 and VMs 150 located elsewhere. In any case, either physically or virtually, these data packets are flowing through the VMs 150.

The network 330 is a network of data processing nodes interconnected for the purpose of data communication, which may be utilized to communicatively couple various components of the environment 300. The network 330 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a VPN (virtual private network), a SAN (storage area network), a frame relay connection, an AIN (Advanced Intelligent Network connection), a SONET (synchronous optical network connection), a digital T1, T3, E1 or E3 line, DDS (Digital Data Service) connection, DSL (Digital Subscriber Line) connection, an Ethernet connection, an ISDN (Integrated Services Digital Network) line, a dial-up port, such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 330 may further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

Each computing appliance 310 may refer to a server, a storage system, computer, a laptop, a tablet computer, a portable computing device, a personal digital assistant (PDA), a handheld cellular phone, a mobile phone, a smart phone, a handheld device having wire or wireless connection capability, or any other electronic device suitable for communicating data via the network 330.

The computing appliance 310 may be configured to interact with the host computer 100 and transfer data over the network 330. The VMM 320 can be located within or without the host computer 100 and configured to run the virtual machine 150. The virtual machines 150 may provide a complete system platform, which may emulate the execution of an operating system and one or more software applications.

The virtual machine manager 320 or the hypervisor (not shown but described above) can be implemented as hardware, software or a combination thereof to generate, manage and allow multiple virtual machines 150 to run concurrently on the host computer 100. The virtual machine manager 320 can be implemented as a separate appliance as shown in the figure; however, in certain embodiments, it can be integrated within the host computer 100. When implemented separately, the virtual machine manager 320 can be interrelated with the host computer 100 directly or via the network 330.

Figure 4:
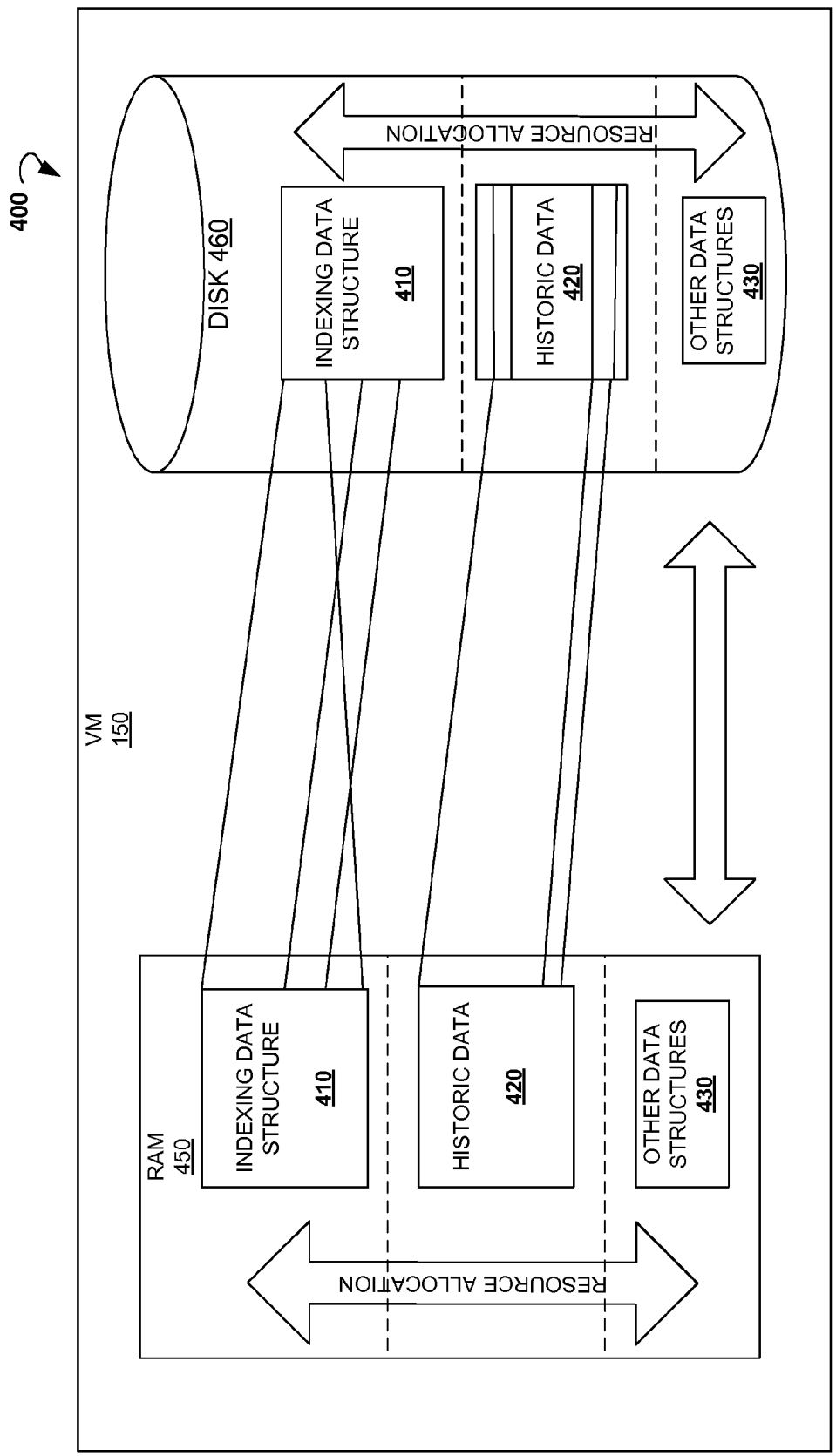
FIG. 4 shows a block diagram of a computer network environment suitable for implementing virtual machines.

FIG. 4 is a block diagram showing a simplified data structure configuration 400. Various data structures can be disposed within a RAM 450 and a disk 460 allocated to the VM 150. As shown in FIG. 4, the amount of RAM 450 and disk 460 allocated to the VM 150 may be shared between an indexing data structure 410, historic data 420, and other data structures 430.

If it is determined that the current allocation of RAM 450 to the indexing data structure 410 and historic data 420 is suboptimal, the amount of the RAM 450 and the disk 460 available to these data structures can be reallocated by the software running on the VM 150 inside the host computer 100. For example, the amount of the RAM 450 available to the indexing data structure 410 may be increased so that there is more space to point to the information on the disk 460. As already mentioned above, the historic data 420 may be composed by saving data from data packets that are traversed between the computing appliances 310 shown in FIG. 3. The historic data 420 can be stored on the disk 460 and may include various content such as symbols and/or labels related to the history of events that occurred in the past.

The amount of the historic data 420 that traverses the VM 150 may be quiet large. Accordingly, only a subset of the historic data 420 may be stored in the RAM 450. This subset of the historic data is lost when the host computer 100 is turned off. The amount of the historic data 420 currently stored in the RAM 450 may not be optimal for the size of the RAM 450 available to the VM 150 and the current partitioning of the RAM 450 between the indexing data structure 410 and the historic data 420. In response, the VMM 320 may decide to move some of the historic data 420 from the RAM 450 to the disk 460. As some historic data 420 is moved to the disk 460 to free the RAM 450, the VMM 320 may increase the amount of the RAM 450 available to the indexing data structure 410 to better allocate resources between a subset of the historic data 420 and the indexing data structure 410.

Figure 5:
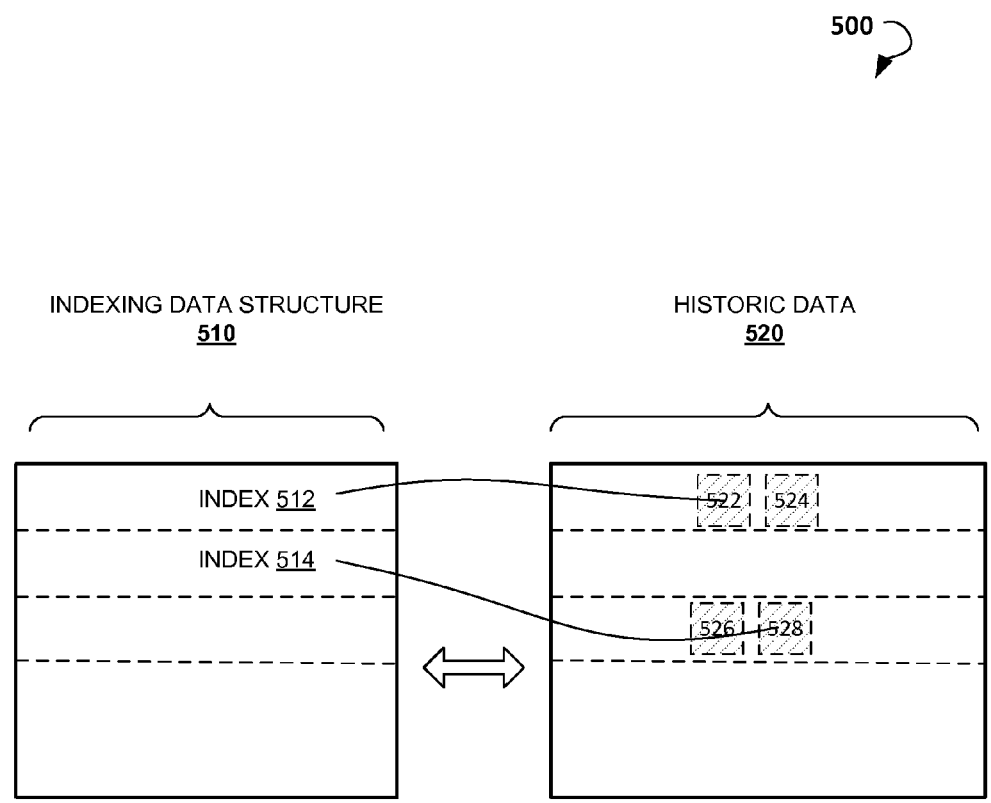
FIG. 5 shows a block diagram of a data structure configuration.

FIG. 5 is a block diagram showing a simplified data structure configuration 500. The data structure configuration 500 can be utilized to store and organize data so that the stored data can be efficiently retrieved, searched, stored, and transferred.

In the example shown, the data structure configuration 500 may comprise an indexing data structure 510 and a historic data 520. In some exemplary embodiments, the indexing data structure 510 can be utilized in the RAM 450, while the historic data 520 can be utilized in the disk storage 460.

The historic data 520 may keep (where possible) storing the data packets sequentially as they flow between the computing appliances into a continuous sequence of data in order to optimize use of the disk. Indices 512 and 514 may represent hash entry points into that the sequence of the historic data 520. Preferably, the historic data 520 is not divided into data elements and, therefore, there may be no one-to-one correspondence between indices of the indexing data structure 510 and the historic data 520. For example, the index 512 may point to a byte 522 and index 514 may point to a byte 528. Bytes 524 and 526 may have no indices pointed to them at all. Additionally, the indices 512 and 514 may be associated with hash values that are internal or external (depending on how big the hash table is) to the indexing data structure 510. In some embodiments, the historic data 520 may be delineated by a rolling hash function or Rabin fingerprinting scheme. For example, the rolling hash function may provide a rolling hash for every byte of the historic data 520 and matching a certain predetermined criteria.

Figure 6:
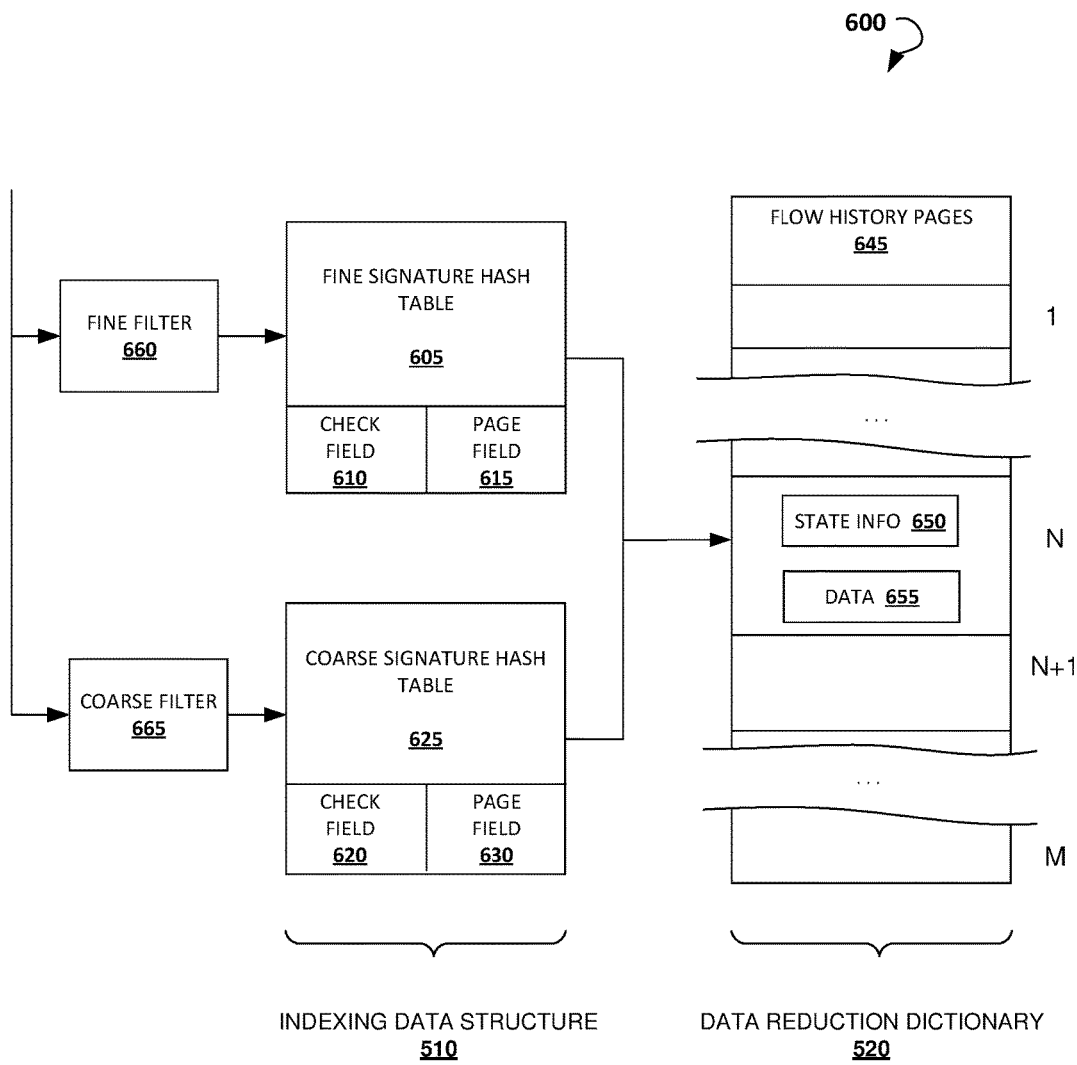
FIG. 6 shows a block diagram of a data structure configuration.

FIG. 6 is a block diagram showing a simplified data structure configuration 600. The data structure configuration 600 can be disposed within the VM 150 to store and organize data therein so that the stored data can be efficiently retrieved, searched, stored, and transferred. According to this exemplary embodiment, the data structures may include a fine signature hash table (SHT) 605, a coarse signature hash table (SHT) 625, and flow history pages (also called historic data) (FHPs) 645.

The fine SHT 605 may include one or more entries comprising, for example, a check field 610 and a page field 615. The coarse SHT 625 may include one or more entries comprising a check field 620 and a page field 630. The FHPs 645 may include one or more pages (e.g., pages 1 to M). Each page (e.g., page N) may include page state information 650 and store data 655.

The virtual machine manager 320 may calculate hashes (i.e., a value returned by a hash function) at every received data element (i.e., a byte). In some embodiments, the data elements can be transferred over the network 330, and thus data elements may include Internet Protocol (IP) data packets or the like. The hashes in this case may be influenced by preceding bytes in the data flow. For example, the hashes can be influenced by n previous bytes. In this case, some examples of calculating the hashes may include cyclical redundancy checks (CRCs) and checksums over the previous n bytes of the data flow. In some embodiments, rolling implementations of CRCs and checksums can be used where a new byte is added, and a byte from n bytes earlier is removed.

Each calculated hash can be filtered by a fine filter 660 and a coarse filter 665. The VMM 320 may designate the locations in the data flow that meet the fine and coarse filter criteria as fine and coarse sync-points, respectively. The fine filter 660 and the coarse filter 665 may have different filter criteria. Typically, the filter criteria for the coarse filter 665 is more restrictive and may be used to further filter those hashes which pass the fine filter 660. In other words, the fine filter 660 may produce a fine comb of sync-points, and the coarse filter may produce a coarse comb of sync-points. One example of the filter criteria is the null filter, which allows results in sync-points at all locations. In another example, the filter criteria declares a fine sync-point when the top five bits of the hashes are all zeros, and a coarse filter criteria that stores or compares hashes when the top ten bits of the hashes are all zeros. The hashes at the fine sync-points index the fine SHT 605, and the hashes at the coarse sync-points index the coarse SHT 625. For example, the index could be derived from the hash by using a number of low order bits from the hash. The filter criteria affect the sizing of the SHTs 605 and 625 and the probability of matching a hash in the SHTs 605 and 625. The more sync-points that are generated, the easier it is to identify repeated data but the larger the tables (i.e., the SHTs 605 and 625) need to be in order to index a given amount of information for the data flow. Having a coarse and fine table helps optimize this tradeoff. Alternative implementations may use a single table or multiple tables.

The fine SHT 605 can be populated with hashes as the data is stored and when the data is recalled from disk storage 220 or other locally accessible storage. The fine SHT 605 finely indexes the received data. In some embodiments, the fine SHT 605 may hold approximately one entry for every 100 bytes of the received data. The coarse SHT 625 can be populated as the data is stored and is coarsely indexed. For example, the coarse SHT 625 may hold one entry for approximately every 4 kilobytes (KB) of the data. The fine SHT 605 and the coarse SHT 625 may be also considered short term and long term memory index structures, respectively.

In this example, VM 150 may include a fine SHT 605, a coarse filter 665, and a FHP 645 data structure, and the computing appliance 310 may also include a fine SHT 605, a coarse filter 665, and a FHP 645 data structure. Each appliance in the computer network environments 300 or 400 may maintain the separate data structures, with may include separate filter criteria for the fine filters 660 and the coarse filters 665. The page state information 650, in the FHP 645 of each appliance in the computer network environments 300 or 400, includes page parameters, page ownership permissions, peer state, and a list of valid byte ranges for each appliance in the computer network environments 300 or 400. Those skilled in the art would appreciate that the data structure 510 and historic data 520 can be differently established and managed, depending on specific application.

Figure 7:
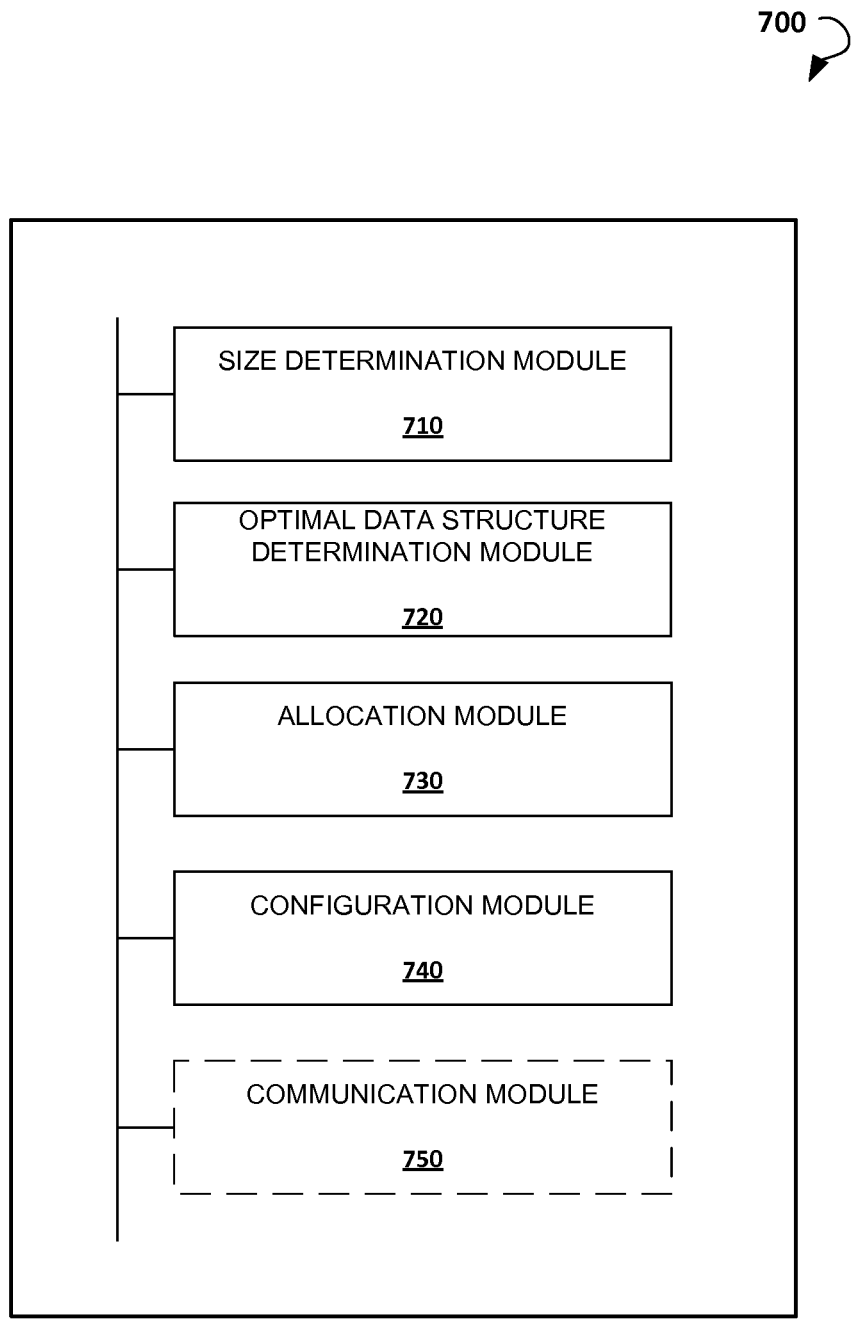
FIG. 7 shows a diagram of a system for the optimization of resources within a virtual machine.

FIG. 7 is a diagram of a system 700 for the optimization of resources within a virtual machine. In this embodiment, the system 700 for the optimization of resources within the virtual machine may include a size determination module 710, an optimal data structure determination module 720, an allocation module 730, a configuration module 740, and a communication module 750.

In other embodiments, the system 700 for optimization of resources within the virtual machine may include additional, fewer, or different modules for various applications. Furthermore, all modules can be integrated within a single apparatus, or, alternatively, can be remotely located and optionally be accessed via a third party.

The size determination module 710 may be configured to determine the sizes of computing resources available to a virtual machine 150. This determination can be performed by requesting the virtual machine manager 320 or, in some examples, the host computer 100, to provide the sizes of allocated resources. In yet another exemplary embodiment, the size determination module 710 may measure or in some other way acquire computing resources usage metrics in order to determine the sizes of computing resources available to the virtual machine. Typical computing resources metrics may include the number of used processors, allocated memory resources including RAM and disk storage, memory hierarchy, memory organization, communication latency, bandwidth, and so forth.

The optimal data structure determination module 720 can be configured to determine optimal data structures for the virtual machine 150. In some examples, the optimal data structures may include the indexing data structure 510 and the historic data 520 as described above with reference to FIG. 5. The determination of optimal data structures can be performed in various ways, but in any case, they depend on the determined sizes of the available computing resources. The determination of optimal data structures includes the calculation of the optimal sizes of tables (arrays) used in the indexing data structure 510 and the historic data 520 such that there is the right balance between them. In other words, the size of the indexing data structure 510 depends on the size of the historic data 520, and the optimal sizes may be either defined based on an iteration calculation process, a statistical method, or prior historical data of the considered virtual machine 150 or any other virtual machine in the container (in this case, the virtual machine 150 may generate a request to the VMM 320 or any other virtual machine 150 in the container to acquire such historical data, although other ways of acquiring the historical data can be used). Those skilled in the art would appreciate that multiple methods of determining optimal sizes are applicable.

In general, the determination of optimal data structures is a tradeoff of the sizes related to the indexing data structure 510 and the historic data 520. For example, if the virtual machine 150 is provided with additional space in the disk storage 220, a new balance should be determined to optimize used data structures. In this case, when the historic data 520 associated with the disk storage 220 is increased, the stored data should be properly indexed, and thus the indexing data structure 510 associated with the RAM 210 is in need for optimization to be enabled to effectively index all data stored in the extended disk storage 220. Alternatively, for example, when the indexing data structure 510 is provided with a large size, but the historic data 520 is relatively small, the exceeded size of the indexing data structure 510 will be useless, while some data cannot even get data reduction. Thus, the optimization process of optimal data structures is the way of adapting sizes of data structures (e.g., table sizes) as used in the virtual machine 150 responsive to the size of available computing resources that were already allocated to the virtual machine 150.

The allocation module 730 can be configured to allocate the computing resources (such as the RAM 210 and the disk storage 220 to the optimal data structures, as determined by the optimal data structure determination module 720).

The configuration module 740 can be used to configure the optimal data structures within the RAM 210 and the disk storage 220. The configuring can be performed in real time to tie the virtual machine 150 to a changing computing resources environment. Thus, the optimization of allocated resources can be performed dynamically.

The communication module 750 can be configured to communicate, to a further virtual machine 150 or a virtual machine manager 320, information related to the optimal data structures for the virtual machine 150. The communication of such information can be performed based on requests received or on an ongoing basis (for example, each time the computing resources for certain virtual machine 150 are optimized).

Figure 8:
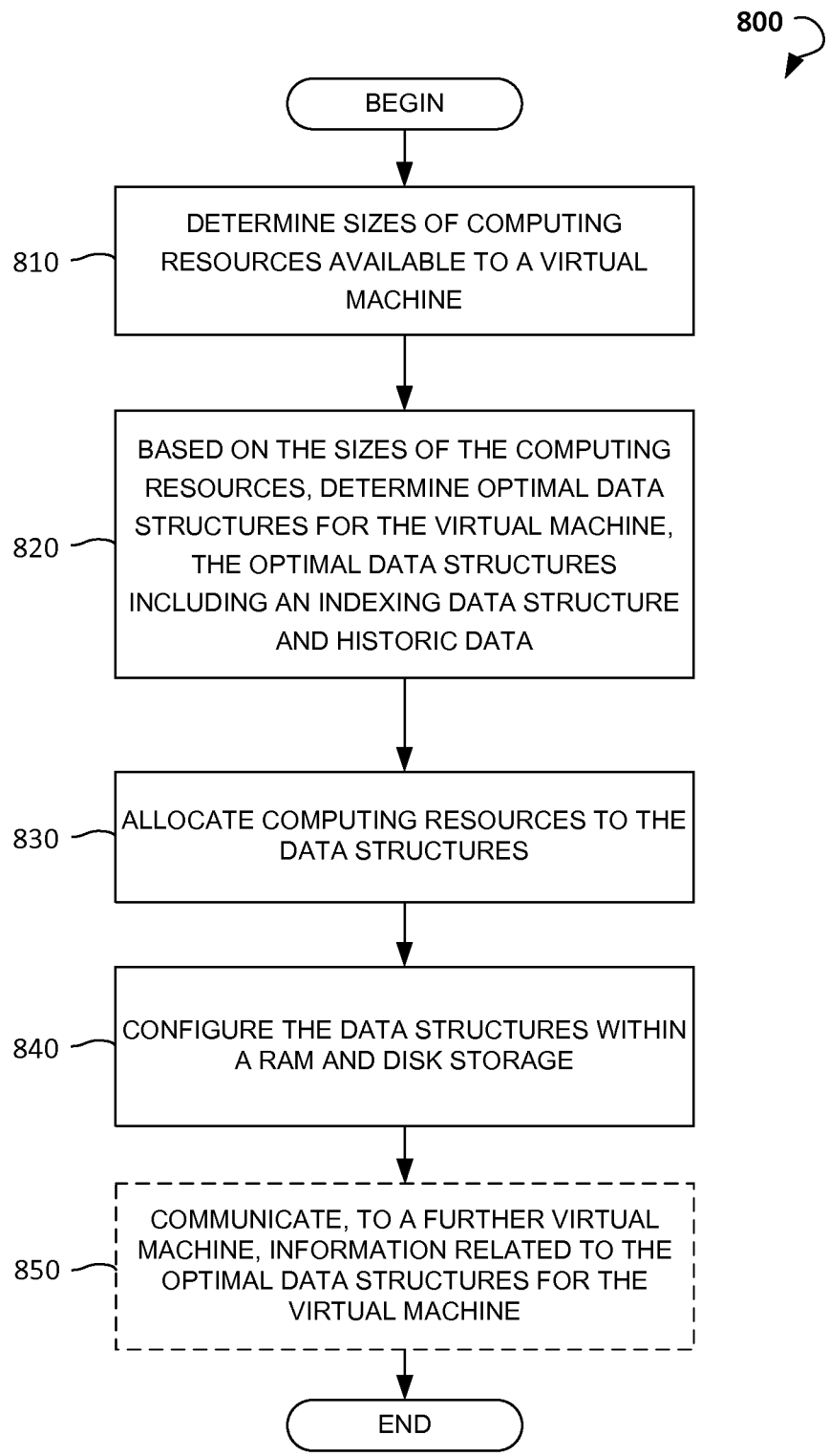
FIG. 8 shows a process flow diagram of a method for the optimization of resources within a virtual machine.

FIG. 8 is a process flow diagram showing a method 800 for the optimization of resources within a virtual machine. The method 800 may be performed by processing logic that may comprise hardware (e.g., dedicated logic, programmable logic, and microcode), software (such as software run on a general-purpose computer system or a dedicated machine), or a combination of both. In one exemplary embodiment, the processing logic resides at the VM 150 or the virtual machine manager 320.

The method 800 can be performed by various modules discussed above with reference to FIG. 7. Each of these modules can comprise processing logic. It will be appreciated by one of ordinary skill that examples of the foregoing modules may be virtual, and instructions said to be executed by a module may, in fact, be retrieved and executed by a processor. Although various modules may be configured to perform some or all of various steps described herein, fewer or more modules may be provided and still fall within the scope of various embodiments.

As shown in FIG. 8, the method 800 may commence at operation 810 with the size determination module 710 determining the sizes of computing resources available to the virtual machine 150. The determination can be implemented by requesting that the virtual machine manager 320 and/or the host computer 100 provide information about the sizes of allocated and available computing resources. In some other examples, this determination can be implemented by acquiring and processing computing resources usage metrics.

At operation 820, the optimal data structure determination module 720 determines optimal data structures for the virtual machine 150. As described above, the optimal data structure is based on the determined sizes of the available computing resources. The determination of optimal data structures may include the calculation of an optimal size balance between the indexing data structure 510 and the historic data 520. The optimal sizes may be determined based on an iteration calculation process, a statistical method, or prior historical data of the considered virtual machine 150 or any other virtual machine in the container. Even though allocating the available computing resources between the indexing data structure 510 and the historic data 520 is important, it will be appreciated that the systems and methods described herein are not limited to such data structures and can involve allocating resources among other resources within the RAM and/or storage.

At operation 830, the allocation module 730 allocates the computing resources, such as the RAM 210 1-N and the disk storage 220 1-N, to the data structures as determined at operation 820. At operation 840, the configuration module 740 configures the optimal data structures within the RAM 210 1-N and the disk storage 220 1-N.

At optional operation 850, the communication module 750 may communicate, to a further virtual machine 150 or a virtual machine manager 320, information related to the optimal data structures for the virtual machine 150.

Figure 9:
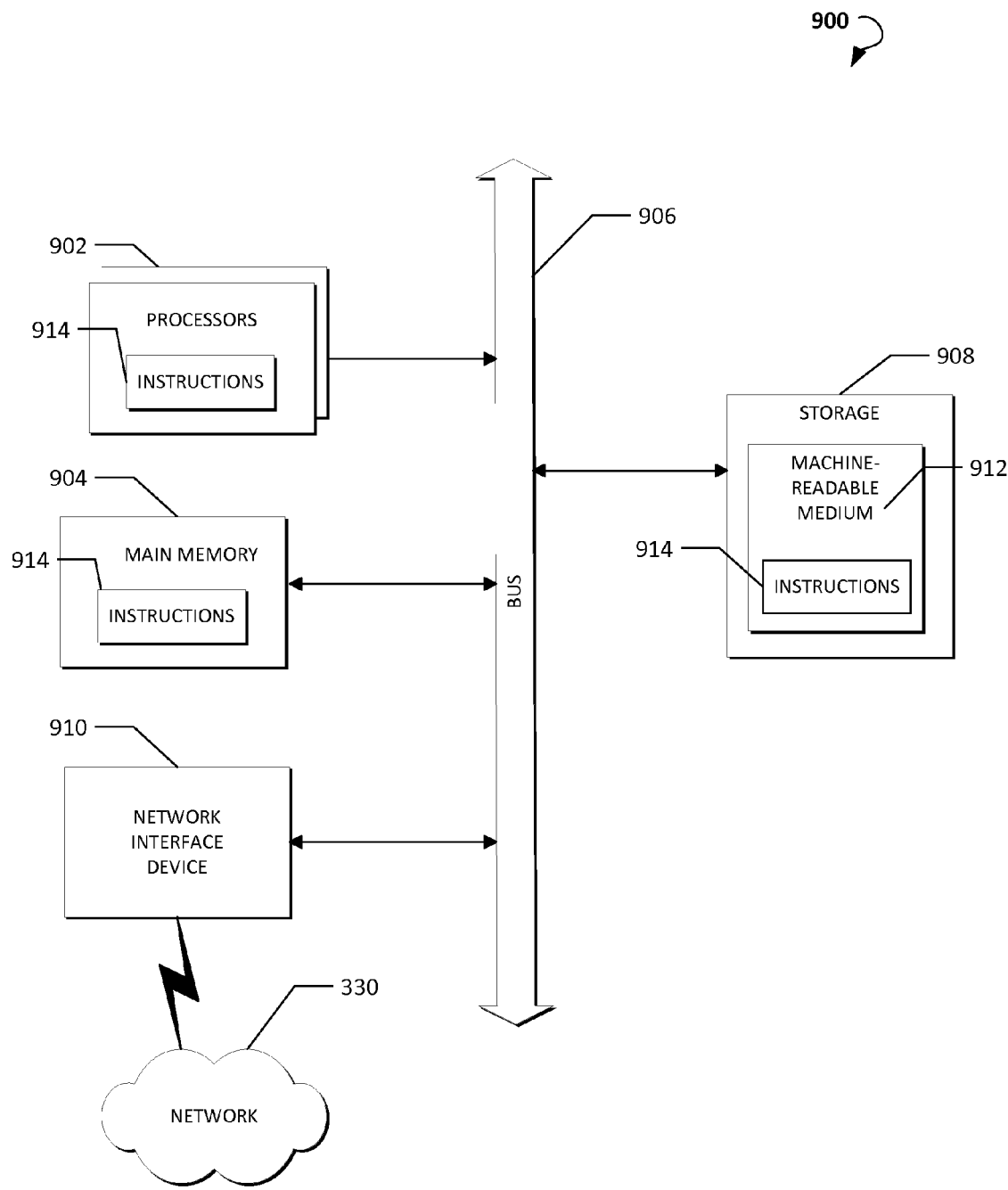
FIG. 9 is a diagrammatic representation of an exemplary machine in the form of a computer system within which a set of instructions, for the machine to perform any one or more of the methodologies discussed herein, is executed.

FIG. 9 shows a diagrammatic representation of a computing device for a machine in the exemplary electronic form of a computer system 900, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, storage system, personal computer (PC), a tablet PC, a cellular telephone, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor or multiple processors 902 (e.g., a CPU), and a main memory 904, which communicate with each other via a bus 906. The computer system 900 can further include storage 908 and a network interface device 910.

The storage 908 may include a one or more computer-readable media 912, which stores one or more sets of instructions and data structures (e.g., instructions 914) embodying or utilized by any one or more of the methodologies or functions described herein. The instructions 914 can also reside, completely or at least partially, within the main memory 904 and/or within the processors 902 during execution thereof by the computer system 900. The main memory 904 and the processors 902 also constitute machine-readable media. The instructions 914 can further be transmitted or received over the network 330 via the network interface device 910 utilizing any one of a number of well-known transfer protocols (e.g., Hyper Text Transfer Protocol (HTTP), CAN, Serial, and Modbus).

While the computer-readable medium 912 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, RAMs, ROMs, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Java, C, C++, Perl, Visual Basic, or other compilers, assemblers, interpreters or other computer languages or platforms.

Thus, a computer-implemented method and systems for the optimization of resources within a virtual machine are described. These methods and systems may effectively be used to optimize balances between the sizes of used data structures responsive to the changed sizes of computing resources allocated to a virtual machine. Thus, the overall performance of the virtual machine is increased.

Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method for apportioning resources within a virtual machine, the method comprising:
   discovering allotted computing resources available to the virtual machine, the allotted computing resources including at least a Random Access Memory (RAM) and a disk storage;
   determining, in an iterative process, an apportionment of each of the discovered allotted computing resources, to at least two data structures for the virtual machine, wherein the at least two data structures comprise a historic packet data store including at least a portion of a payload of data packets extracted sequentially from flows of network data traveling across a network and an indexing data structure that indexes the historic packet data;
   dynamically allocating, independently from a host server and according to the determined apportionment, a portion of the Random Access Memory (RAM) and a portion of the disk storage available to the virtual machine to each of the at least two data structures from the discovered allotted computing resources available to the virtual machine; and
   configuring according to the determined apportionment the at least two data structures within the RAM available to the virtual machine and configuring according to the determined apportionment the at least two data structures within the disk storage available to the virtual machine.

2. The method of claim 1, further comprising communicating, to a further virtual machine, information related to the data structures for the virtual machine.

3. The method of claim 1, wherein the computing resources further include a Central Processing Unit (CPU) and a Virtual Machine (VM) container.

4. The method of claim 1, wherein the data structure sizes are affected by specific historical measurements.

5. The method of claim 1, wherein the data structures are based on relative sizes between the indexing data structure and the historic packet data, such that the size of the indexing data structure depends on the size of the historic packet data.

6. The method of claim 1, wherein the indexing data structure comprises one or more signature array hash tables, and the historic packet data comprises flow history pages.

7. The method of claim 6, wherein determining the indexing data structure comprises determining sizes of the one or more signature array hash tables and the flow history pages.

8. The method of claim 7, wherein the determining sizes of the one or more signature array hash tables is an iterative process.

9. The method of claim 1, wherein the discovering allotted computing resources available to the virtual machine comprises requesting a virtual machine manager to provide information related to allotted resources and/or acquiring computing resources usage metrics.

10. The method of claim 1, further comprising:
storing the historic packet data within the virtual machine; and
updating contents of at least one hash table within the virtual machine based on the historic packet data.

11. A system for apportioning resources within a virtual machine, comprising:
a processor to execute modules, the modules comprising:
a determination module configured to discover computing resources available to the virtual machine, the computing resources including at least a Random Access Memory (RAM) and a disk storage;
a data structure determination module configured to iteratively determine an apportionment of each of the discovered computing resources to at least two data structures for the virtual machine, the data structures comprising a historic packet data store including at least a portion of a payload of data packets extracted sequentially from flows of network data traveling across a network and an indexing data structure that indexes the historic packet data;
an allocation module configured to dynamically allocate, independently from a host server and according to the determined apportionment, a portion of the Random Access Memory (RAM) and a portion of the disk storage available to the virtual machine to each of the at least two data structures, from the discovered computing resources available to the virtual machine; and
a configuration module to configure according to the determined apportionment the at least two data structures within the RAM available to the virtual machine and configure according to the determined apportionment the at least two data structures within the disk storage available to the virtual machine.

12. The system of claim 11, further comprising a communication module configured to communicate, to a further virtual machine, information related to the data structures for the virtual machine.

13. The system of claim 11, wherein the data structure sizes are based on specific historical packet data.

14. The system of claim 11, wherein the data structures are based on relative sizes between the indexing data structure and the historic packet data.

15. The system of claim 11, further comprising a paged memory system for the data structures.

16. The system of claim 11, wherein the indexing data structure comprises one or more signature array hash tables and the historic packet data comprises a flow history pages table.

17. The system of claim 16, wherein the data structure determination module is further configured to determine sizes of the one or more signature array hash tables and the flow history pages table.

18. The system of claim 11, wherein the determination module is further configured to request a virtual machine manager to provide information related to allotted resources and/or acquire computing resources usage metrics in order to discover alloted computing resources available to the virtual machine.

19. The system of claim 11, wherein the data structure determination module is further configured to store the historic packet data within the virtual machine, and update contents of at least one hash table within the virtual machine based on the historic packet data.

20. A non-transitory computer-readable medium having instructions stored thereon, which when executed by one or more computers, causes the one or more computers to:
discover allotted computing resources available to a virtual machine, the allotted computing resources including at least a Random Access Memory (RAM) and a disk storage;
iteratively determine an apportionment of each of the discovered allotted computing resources, to at least two data structures for the virtual machine, wherein the at least two data structures comprise a historic packet data store including at least a portion of a payload of data packets extracted sequentially from flows of network data traveling across a network and an indexing data structure that indexes the historic packet data;
dynamically allocate, independently from a host server and according to the determined apportionment, a portion of the Random Access Memory (RAM) and a portion of the disk storage available to the virtual machine to each of the at least two data structures from the discovered allotted computing resources available to the virtual machine; and
configure according to the determined apportionment the at least two data structures within the RAM available to the virtual machine and configure according to the determined apportionment the at least two data structures within the disk storage available to the virtual machine.

\* \* \* \* \*